Aug. 4, 1942.   W. McKAY   2,292,006
UNIVERSAL FLIGHT INSTRUMENT
Filed March 12, 1940

INVENTOR.
WALTER McKAY
BY Joseph H. Lipschutz
ATTORNEY.

Patented Aug. 4, 1942

2,292,006

UNITED STATES PATENT OFFICE 2,292,006

UNIVERSAL FLIGHT INSTRUMENT

Walter McKay, New York, N. Y., assignor to Sperry Products, Inc., Hoboken, N. J., a corporation of New York Application March 12, 1940, Serial No. 323,516

4 Claims. (Cl. 33—223)

This invention relates to universal flight indicators which may be magnetic compasses or attitude-of-flight indicators such as artificial horizons or similar instruments of the general type disclosed in the co-pending application of Elmer A. Sperry, Jr., Serial No. 140,650, filed May 4, 1937.

The main problem which is present in these instruments arises from the fact that the sensitive element thereof must be stabilized in a given plane in order to give a useful indication. Thus, for instance, in the case of an artificial horizon or a magnetic compass it is essential that the sensitive element be stabilized in the horizontal plane so that a reference horizon or an indication in azimuth may be obtained. It is this necessity for stabilizing the sensitive element in a given plane which requires the use of pendulous elements, but necessarily, therefore, acceleration forces acting upon said pendulous elements give rise to very substantial acceleration errors. For this reason it was proposed in the said application of Elmer A. Sperry, Jr., that the sensitive element shall consist of an inertia element in the form of a float pivotally mounted against a fixed pivot, the said float having its center of gravity and center of buoyancy carefully adjusted to coincide with the center of pivotal movement of the float on said pivot. A small pendulum was then added to the float, the said pendulous factor being just sufficient to cause the float to settle against the friction of its bearing and hence the acceleration forces acting upon the said inertia element would be held to a minimum. It was further proposed that the pendulum be rigidly connected to the float only within narrow limits of movement and thereafter the connection between the pendulum and the float become loose or yielding so that further displacement of the pendulum would not result in further displacement of the float.

In spite of the above precautions it will be recognized that a certain amount of pendulosity is always present even after the pendulum has yielded relative to the float so that no further increase in pendulosity occurs in response to increased acceleration. This pendulosity, while small, is nevertheless sufficient to introduce a certain amount of error in response to acceleration forces, and it will be readily understood that in the case of other similar instruments in which the pendulum is at all times rigidly connected to the sensitive element, such errors are even greater as the acceleration forces and their duration increase. It is the principal object of this invention, therefore, to provide means whereby the acceleration forces acting upon an instrument of the type described will introduce substantially no error in response to acceleration forces. For this purpose, I provide means whereby the pendulosity of the system is automatically removed in response to acceleration forces in excess of a predetermined degree.

Further objects and advantages of this invention will become apparent in the following detailed description thereof.

In the accompanying drawing.

Figure 1:
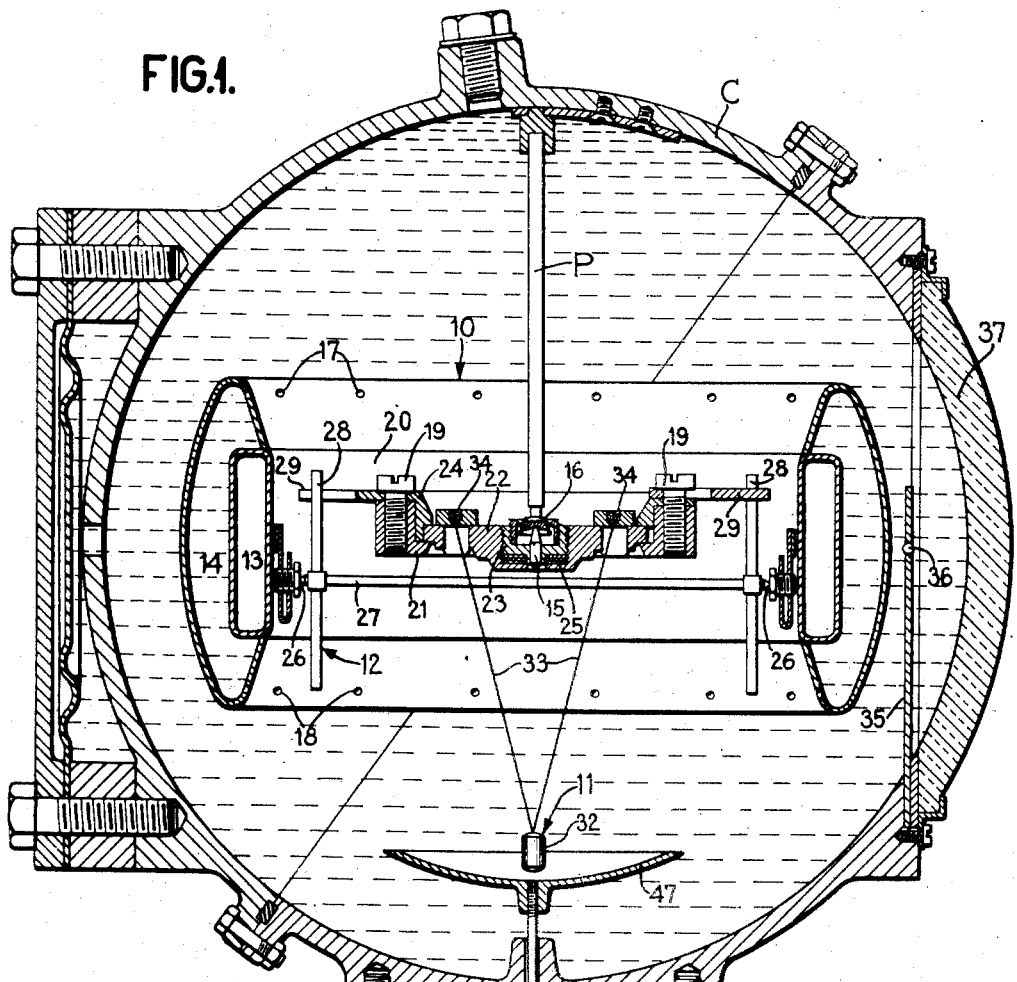
Fig. 1 illustrates a vertical section through a universal flight instrument embodying one form of my invention.
Figure 2:
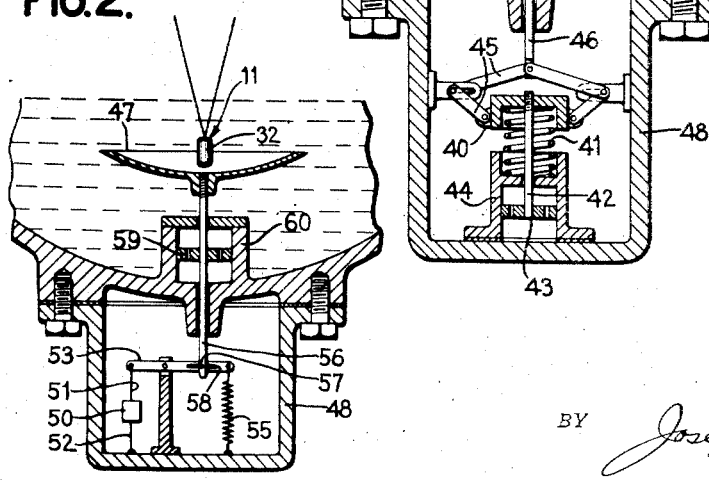
Fig. 2 is a vertical section through a modified form of a portion of Fig. 1.

I have illustrated my invention as applied to a magnetic compass, but it will become apparent from the following description that the invention is applicable to all types of universal flight instruments in which a pendulous element is necessary for the purpose of stabilizing the sensitive or indicating element in a given plane.

The magnetic compass shown consists of an inertia or magnetic element 10 and a pendulous element 11. The inertia or magnetic element consists of a magnet system 12 and a float upon which the magnet system is supported. The float may consist of an inner sealed circumferential float chamber 13 which provides the necessary buoyancy and is surrounded by an outer chamber 14 which is filled with liquid which enters through top and bottom ports 17 and 18. In this manner the float obtains the desirable quality of large inertia due to the fact that liquid is substantially trapped in the outer chamber 14. The float is supported by the pivot 15 resting against a jewel 16 in the bottom of a pivot post P which is fixed within casing C which is filled with fluid so that the outer chamber 14 of the float chamber will always be full of liquid. The float is formed with an inner cylindrical hollow chamber 20 within which is mounted the supporting flange 21 which supports a plate 22 carrying the pivot 15. The said pivot is fitted into a socket 23 which is in turn screwed into the supporting plate 22 and the height of the pivot point may be adjusted by means of shims 25 interposed between the bottom of socket 23 and the supporting plate 22. It will be seen that by means of this adjustment the center of the pivot may be brought into predetermined relationship vertically with the center of gravity and center of buoyancy of the sensitive element. For this purpose, also, a lateral adjustment of plate 22 on supporting flange 21 is provided, an upper flange 24 being provided so that plate 22 may move laterally between members 21 and 24 and may be locked in adjusted position by screws 19. The lateral adjustment of plate 22 on the supporting flange may be accomplished by means of adjusting screws (not shown) arranged in quadrature. This adjustment together with the vertical adjustment by means of shims 25 enables the center of buoyancy of the sensitive element thus far described to be brought into any desired relationship with the center of pivotal movement. For adjusting the center of gravity to cause the same to be brought into the desired relationship with the center of pivotal movement, there may be provided sets of weights (not shown) arranged in quadrature so that the center of gravity of the float may be adjusted laterally in any direction. For adjusting the center of gravity vertically there may preferably be provided sets of vertically adjustable screws (not shown).

Also supported in the said cylindrical interior 20 of the float are bearings 26 in which is journalled the shaft 27 carrying magnets 28 adjacent its opposite ends so that said magnets may be free to take up their natural angle of dip. Stops 29 limit the movement of magnets 28 to less than 180°.

The pendulous element may consist of a small weight 32 suspended by threads 33 from the plate 22 to which said threads are attached. The threads form a cone which is rigid within a few degrees of displacement, but when the acceleration forces exceed a predetermined degree, certain of the threads pivot around their point of attachment 34 while others of the threads become loose so that no further increase in torque is applied to the sensitive element by the pendulous element. The outer surface of float chamber 14 may carry indicia which may be read in conjunction with vertical and horizontal lubber lines 35, 36 through observation window 37.

The action of a magnetic compass as described above is now well known. Because of the fact that the entire sensitive element, exclusive of the small pendulous element, is in substantially neutral equilibrium, it will not be affected by acceleration forces, and the said acceleration forces act only upon the small pendulous element which is employed for the purpose of stabilizing the said sensitive element. This pendulous element, as described, having been made as small as possible, which is to say just sufficient to overcome pivot friction of the sensitive element, the errors introduced in response to acceleration forces will necessarily be small. When the acceleration forces exceed a predetermined degree, the threads become flexed and therefore the pendulous element cannot apply any greater torque to the sensitive element and therefore said disturbing torque remains constant. Nevertheless, such errors do exist, and particularly if the acceleration force acting thereon is of long duration it is possible for a substantial error to be introduced. In order to avoid such error, I provide means for eliminating the pendulosity of the sensitive element automatically in response to acceleration forces in excess of a predetermined degree which act for a period in excess of a predetermined time interval. In the present instance, this mechanism may take the form of an acceleration responsive device which serves to lift the weight and release the tension on the threads so that such weight no longer applies a torque to the sensitive element. While the mechanism may take various forms, I have disclosed the same as housed within a casing 48 and comprising a mass 40 normally spring pressed upwardly by spring means 41 and connected by a stem 42 to the piston 43 of a dash-pot 44 so that in response to acceleration forces, either straight down or due to increase in "g" caused by acceleration force, the weight will move downwardly against said spring and will be delayed in its movement by the dash-pot.

If the acceleration forces are sufficiently great and if they act for a sufficiently long time interval, then the said mass will move downward far enough so that by means of a toggle connection 45 to a stem 46 carrying a cup 47 on its upper end, the said cup will engage the pendulous mass and lift the same to flex the threads. The strength of the spring and the characteristics of the dash-pot, the degree of leverage and the distance between the cup and the pendulous mass may all be so chosen that said cup will engage said pendulous mass in response to the acceleration force of predetermined magnitude acting for a predetermined time interval.

As hereinbefore stated, the mass 40 is responsive only to acceleration downwardly or to acceleration in response to such centrifugal force as tends to increase the "g" factor. The latter acceleration force takes place on turns and is the principal acceleration force for which it is necessary to make provision. However, it may be desired to render the weight-lifting device responsive to acceleration forces due to change of speed or to forces acting in other directions to which the weight 40 in Fig. 1 does not respond. For this purpose there may be employed a mass 50 supported so as to be universally responsive to movement in any direction. For this purpose said mass may be connected to flexible members 51 and 52, the said members being anchored at their other ends to a lever 53 adapted to operate the cup 47, and to the casing 48, respectively. It will be seen that by reason of this suspension the mass 50 will respond to acceleration forces in every direction, and such response will cause a shortening of the distance between the points of connection of the flexible members to the casing 48 and the lever 53 to rock said lever against the action of a spring 55 and move the opposite end thereof upwardly to lift the cup 47 by means of a link 56 connected to the opposite end of lever 53 through a pin and slot connection 57, 58. The link 56 may have beyond its length a dash-pot arrangement including a piston 59 carried by the link 56 and operating within a dash-pot casing 60.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a universal flight instrument, a sensitive member comprising an inertia element, a pendulous element, means for supporting said pendulous element on said inertia element, and means for pivotally supporting said sensitive member for movement about a predetermined center, said sensitive member exclusive of said pendulous element having its center of gravity coincident with said pivotal center, means responsive to acceleration forces, and means actuated by said responsive means and normally out of engagement with said pendulous element but adapted to engage the same to lift said pendulous element to render the same ineffective in response to acceleration forces in excess of a predetermined minimum force acting for a period in excess of a predetermined time interval.

2. In a universal flight instrument, a sensitive member comprising an inertia element, a pendulous element, yieldable means for supporting said pendulous element on said inertia element, and means for pivotally supporting said sensitive member for movement about a predetermined center, said sensitive member exclusive of said pendulous element having its center of gravity coincident with said pivotal center, means responsive to acceleration forces, and means actuated by said responsive means and normally out of engagement with said pendulous element but adapted to engage the same to lift said pendulous element to cause said yieldable means to yield to render the same ineffective in response to acceleration forces in excess of a predetermined minimum force acting for a period in excess of a predetermined time interval.

3. In a universal flight instrument, a sensitive member comprising an inertia element, a pendulous element, means for supporting said pendulous element on said inertia element, and means for pivotally supporting said sensitive member for movement about a predetermined center, said sensitive member exclusive of said pendulous element having its center of gravity coincident with said pivotal center, means responsive to acceleration forces, and means whereby said responsive means renders said pendulous element ineffective in response to acceleration forces in excess of a predetermined minimum force acting for a period in excess of a predetermined time interval, said means whereby said responsive means renders said pendulous element ineffective including means whereby said responsive means directly supplies the power for rendering said pendulous element ineffective.

4. In a universal flight instrument, a sensitive member comprising an inertia element, a pendulous element, means for supporting said pendulous element on said inertia element, and means for pivotally supporting said sensitive member for movement about a predetermined center, said sensitive member exclusive of said pendulous element having its center of gravity coincident with said pivotal center, means responsive to acceleration forces, and means whereby said responsive means renders said pendulous element ineffective in response to acceleration forces in excess of a predetermined minimum force acting for a period in excess of a predetermined time interval, said means whereby said responsive means renders said pendulous element ineffective including a direct mechanical connection between said responsive means and said pendulous element.

WALTER McKAY.